United States Patent
Sutter et al.

(10) Patent No.: US 6,690,129 B1
(45) Date of Patent: Feb. 10, 2004

(54) ELECTRONICALLY COMMUTABLE MOTOR

(75) Inventors: Joerg Sutter, Gaggenau (DE); Wolfgang Schwenk, Oberkirch-Tiergarten (DE); Claude Berling, Drusenheim (FR)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 10/088,272
(22) PCT Filed: Sep. 6, 2000
(86) PCT No.: PCT/DE00/03057
§ 371 (c)(1), (2), (4) Date: Mar. 12, 2002
(87) PCT Pub. No.: WO01/20764
PCT Pub. Date: Mar. 22, 2001

(30) Foreign Application Priority Data

Sep. 15, 1999 (DE) .......................... 199 44 198

(51) Int. Cl.[7] .................................................. H02P 6/20
(52) U.S. Cl. .................... 318/254; 318/430; 318/434; 318/268; 388/909
(58) Field of Search .................... 318/138, 254, 318/430, 431, 434, 439, 720–724, 268; 388/909

(56) References Cited

U.S. PATENT DOCUMENTS

| | | | |
|---|---|---|---|
| 4,288,828 A | 9/1981 | Kuntner et al. .............. | 361/31 |
| 4,623,826 A | 11/1986 | Benjamin et al. ............ | 318/254 |
| 5,017,846 A | 5/1991 | Young et al. ................ | 318/244 |
| 5,349,276 A | 9/1994 | Mezzatesta et al. ......... | 318/268 |
| 5,574,346 A | * 11/1996 | Chavan et al. .............. | 318/434 |
| 5,650,699 A | 7/1997 | Tang et al. .................. | 318/431 |
| 5,682,334 A | 10/1997 | Plutowski et al. | |
| 5,963,706 A | * 10/1999 | Baik .......................... | 388/804 |
| 6,236,179 B1 | * 5/2001 | Lawler et al. ............... | 318/439 |
| 6,469,461 B1 | * 10/2002 | Konda et al. ................ | 318/254 |

FOREIGN PATENT DOCUMENTS

EP  0 680 129  11/1995

* cited by examiner

Primary Examiner—Bentsu Ro
(74) Attorney, Agent, or Firm—Kenyon & Kenyon

(57) ABSTRACT

An electronically commutatable motor, whose excitation windings are controllable via semiconductor output stages by an electronic control unit with the aid of PWM control signals, a setpoint value being specifiable to the control unit, and the control unit emitting corresponding PWM control signals to the semiconductor output stages. The start-up of the motor is monitored in a simple manner and an overloading is prevented in that, with the input of the setpoint value and/or the switching on of the control unit and/or the semiconductor output stages, after a predefined or predefinable starting time has expired, a monitoring device monitors the speed of the motor to check whether a minimum speed has been reached, and if the minimum speed is not reached, the control unit and/or the semiconductor output stages is/are disconnectible.

7 Claims, 1 Drawing Sheet

ELECTRONICALLY COMMUTABLE MOTOR

FIELD OF THE INVENTION

The present invention relates to an electronically commutatable motor, whose excitation windings are controllable via semiconductor output stages by an electronic control unit with the aid of PWM control signals, a setpoint value being specifiable to the control unit, and the control unit emitting corresponding PWM control signals to the semiconductor output stages; and a monitoring device for the speed of the motor is provided with which a faulty movement or a standstill of the motor is detectable, and the motor is able to be switched off.

BACKGROUND INFORMATION

U.S. Pat. No. 5,349,276 describes an electronically, commutatable motor of this type. In this known motor, the speed (=rpm) is predefined and monitored within a specific framework of minimum to maximum rpm. If this framework is left, the engine is switched off. Thus, an immediate and quick detection of the proper revolution, and specifically as a function of a predefined setpoint value of the rpm, is not possible. If difficulties—sluggishness or locking of the motor—occur during the start-up, the motor can become overloaded and damaged before it gets within the monitored speed range.

Such motors are used for various application cases. Depending upon the type of construction, these motors have a plurality of stop locations which frequently bring with them difficulties for the start-up of the motor, and can result in the motor not starting up, even in response to the input of a setpoint value. In addition, mechanical faults may exist that result in a locking of the motor at standstill, which can lead to overloading upon application of a setpoint value at the control unit.

U.S. Pat. No. 5,682,334 deals with a start-up monitoring of the motor, which, however, does not work with predefined fixed values, but rather has stored a predetermined acceleration characteristic that is defined by points of time and speed. The monitoring is carried out in the manner that a reached motor speed =rpm and the time elapsed since the beginning of the start-up are compared to the time allocated for this speed in the stored characteristic. In this context, the same start-up conditions and a defined preset start-up characteristic are assumed; however, in many cases the motor is put into operation with different start-up conditions for different operating states. This is not easily possible using the known start-up monitoring.

SUMMARY OF THE INVENTION

The object of the present invention is to provide an electronically commutatable motor of the type mentioned at the outset, in which monitoring is already carried out at the beginning of the start-up in order to avoid overloading and damage due to overloading.

This objective is achieved according to the present invention in that, when the motor is put into operation by input of a setpoint value and/or switching on the control unit and/or the semiconductor output stages, a start-up time is specifiable to the monitoring device, the start-up time being a function of the magnitude of the predefined setpoint value and preferably increasing as the magnitude of the setpoint value increases, and after the predefined start-up time has elapsed, the monitoring device compares the speed reached by the motor to a minimum speed, and if the minimum speed is not reached, switches off the control unit and/or the semiconductor output stages.

Decisive is a start-up time Tx which is a function of setpoint value $N_{setpoint}$ predefined for the start-up, and therefore takes into account the different start-up characteristic curves. Only after this time is it determined whether achieved speed N of the motor has reached a predefined minimum speed $N_{min}$. By appropriate selection of the predefined start-up times Tx, comparison can continually be made to the same minimum speed $N_{min}$. The monitoring expenditure necessary for this is minimal.

According to one embodiment, the control unit and/or the semiconductor output stages can be switched on and off simply by switching the supply voltage on and off.

In addition, the switch-off of the control unit and/or the semiconductor output stages, and thus of the motor, may be time-delayed.

According to a further embodiment, the missing and/or faulty start-up is able to be indicated visually and/or acoustically.

If the monitoring unit and/or the display device is/are integrated into the control unit, then the structural design of the motor does not change, since the electronic control unit also takes over the functions of the monitoring device.

BRIEF DESCRIPTION OF THE DRAWING

The FIG. 1 is a block diagram illustrating an exemplary embodiment according to the present invention.

DETAILED DESCRIPTION

Figure 1:
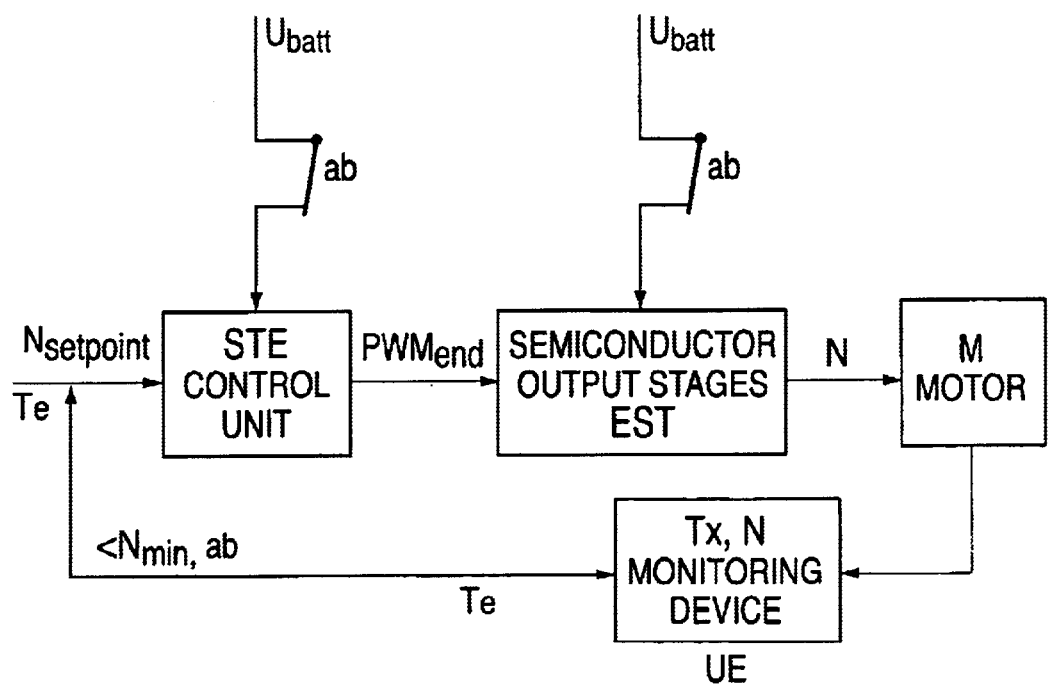

The motor unit includes the following functional units: control unit STE, semiconductor output stages EST and actual motor M having the excitation windings of the stator and having the permanent-magnet rotor which may be constructed as an external or internal rotor.

If motor M is to be put in operation, then a setpoint value $N_{setpoint}$, which is intended to lead to a speed N of motor M, is specified to control unit STE. For example, the setpoint selection may be preselected manually via a potentiometer. In control unit STE, a function is predefined which contains the dependence of PWM control signals $PWM_{end}$ for semiconductor output stages EST on speed setpoint value $N_{setpoint}$.

With the switching on of control unit STE and/or of semiconductor output stages EST, a start signal Te is emitted to a monitoring device UE which detects speed N of motor M in a generally known manner.

After a predefined starting time Tx, monitoring device UE, in conjunction with control unit STE, checks whether a predetermined minimum speed $N_{min}$ has been reached. If this is the case, then the start-up of motor M is continued and carried on up to the continuous operation with the predefined setpoint speed.

However, if monitoring device UE and/or control unit STE determines that motor M has not started up at all, or corresponding minimum speed $N_{min}$ has not been reached in predefined starting time Tx, then, to protect against overloading, control unit STE and/or semiconductor output stages EST are switched off, as the contacts "off" for switching off supply voltage $U_{batt}$ indicate.

Control unit STE is able to alter the pulse width and/or the commutation frequency of PWM control signals $PWM_{end}$ as a function of setpoint value $N_{setpoint}$.

With increasing setpoint value $N_{setpoint}$, starting time Tx may likewise increase. However, it is always short enough to prevent overloading of the motor and its electronic components. Naturally, this is also applicable when control unit STE and/or the semiconductor output stages is/are switched off in a time-delayed manner.

The missing and/or faulty start-up of the motor may be displayed visually and/or acoustically, or electrically via the setpoint-value line.

Monitoring device UE and/or the display device are preferably integrated with their functions into control unit STE.

What is claimed is:

1. An electronically commutatable motor, comprising:
   a plurality of excitation windings;
   a plurality of semiconductor output stages;
   a control unit for controlling the plurality of excitation windings via the plurality of semiconductor output stages in accordance with PWM control signals and for emitting the PWM control signals to the plurality of semiconductor-output stages, a setpoint value being specificable to the control unit; and
   a monitoring device for monitoring a speed of the electronically commutatable motor and for detecting one of a faulty movement of the electronically commutatable motor and a standstill of the electronically commutatable motor, wherein:
     when the electronically commutatable motor is operated by at least one of an input of the setpoint value and a switching on of at least one of the electronically commutatable motor and the plurality of semiconductor output stages, a start-up time is specificable to the monitoring device,
     the start-up time is a function of a magnitude of the setpoint value,
     after an elapsing of the start-up time, the monitoring device compares the speed of the electronically commutatable motor to a minimum speed, and
     the monitoring device switches off the electronically commutatable motor if the minimum speed is not reached.

2. The electronically commutatable motor according to claim 1, wherein:
   the control unit emits to the plurality of semiconductor output stages one of the PWM control signals tuned in one of a pulse width and a commutation frequency to the setpoint value.

3. The electronically commutatable motor according to claim 1, wherein:
   the switching on of the electronically commutatable motor is effected by switching on a supply voltage, and the switching off of the electronically commutatable motor is effected by switching off the supply voltage.

4. The electronically commutatable motor according to claim 1, wherein:
   a switch-off of at least one of the control unit and the plurality of semiconductor output stages occurs in a time-delayed manner.

5. The electronically commutatable motor according to claim 1, wherein:
   at least one of the faulty movement of the electronically commutatable motor and the standstill of the electronically commutatable motor is presented at least one of visually and acoustically.

6. The electronically commutatable motor according to claim 1, wherein:
   at least one of the monitoring device and a display device is integrated into the control unit.

7. The electronically commutatable motor according to claim 1, wherein:
   the start-up time increases as the magnitude of the setpoint value increases.

* * * * *